United States Patent [19]
Imoto

[11] Patent Number: 5,742,366
[45] Date of Patent: Apr. 21, 1998

[54] LCD HAVING A HEAT CONDUCTION MEANS AND A HEAT ASSIST MEANS

[75] Inventor: Satoshi Imoto, Higashimurayama, Japan

[73] Assignee: Citizen Watch Co., Ltd., Tokyo, Japan

[21] Appl. No.: 808,176

[22] Filed: Feb. 28, 1997

Related U.S. Application Data

[63] Continuation of Ser. No. 171,455, Dec. 22, 1993, abandoned.

[30] Foreign Application Priority Data

Dec. 25, 1992 [JP] Japan ................................ 4-357790

[51] Int. Cl.⁶ ........................ G02F 1/1333; G02F 1/1335
[52] U.S. Cl. ........................ 349/62; 349/58; 349/161
[58] Field of Search .......................... 359/49, 50, 83; 349/62, 70, 58, 161

[56] References Cited

U.S. PATENT DOCUMENTS

| Re. 33,987 | 7/1992 | Suzawa | 359/49 |
|---|---|---|---|
| 4,748,546 | 5/1988 | Ukrainsky | 359/50 |
| 5,299,038 | 3/1994 | Hamada et al. | 359/49 |

OTHER PUBLICATIONS

Patent Abstracts of Japan, vol. 15, No. 477 (P-1283), Dec. 1991, Abstract of JP 3-204618, Sep. 1991.

*Primary Examiner*—William L. Sikes
*Assistant Examiner*—Toan Ton
*Attorney, Agent, or Firm*—Finnegan, Henderson, Farabow, Garrett & Dunner

[57] ABSTRACT

A display device which suppresses the rise in temperature while making the distribution of temperature uniform, and features high display quality and reliability. The display device employs a light-guide plate provided with a heat conduction plate of a large heat conductivity on the back surface thereof. A gap is provided between the heat conduction plate and a holding member on the lower surface that holds the heat conduction plate, fluorescent tubes and the light-guide plate.

52 Claims, 4 Drawing Sheets

LCD HAVING A HEAT CONDUCTION MEANS AND A HEAT ASSIST MEANS

This application is a continuation of application Ser. No. 08/171,455, filed Dec. 22, 1993, now abandoned.

BACKGROUND OF THE INVENTION

1. Field of the Invention

The present invention relates to the structure of a liquid-crystal display device using a light-guide plate.

2. Description of the Related Art

A display device has heretofore been known in which liquid-crystal display elements are arranged in the form of a matrix to constitute a planar display means, a light-guide plate that serves as a back light is disposed on the back surface of the display means, light is introduced into the light-guide plate from side surfaces thereof from a suitable light source such as a fluorescent tube, and light is emitted from the plane of the light-guide plate to illuminate the liquid crystals from the back thereof.

FIGS. 2(A) and 2(B) illustrate structure of a conventional display device employing a light-guide plate, wherein FIG. 2(a) is a bottom view and FIG. 2(b) is an AA' sectional view of FIG. 2(a). The prior display device will now be described with reference to FIGS. 2(a) and 2(b). A light-guide plate reflection sheet 21 is fastened by an adhesive tape or by melt-adhesion to the back surface of a light-guide plate 14 made of a transparent resin, and fluorescent tubes 13 are disposed at both ends of the light-guide plate 14. A fluorescent tube reflection sheet 22 is fastened to the light-guide plate 14 and to the light-guide plate reflection sheet 21 by using an adhesive tape 23 in a manner to wrap around the fluorescent tube 13. A liquid crystal display element 19 is disposed on the surface of the light-guide plate 14, and is held via a spacer 25 by a holding member 12 on the lower surface side and a holding member 20 on the upper surface side which are fastened together by screws 24. Both ends of the fluorescent tubes 13 are connected to a starting circuit 17 through lead wires 18, and the display element is connected to a display circuit 16 through a connection member 15.

The holding member 20 of the upper surface side is provided with a window 8 that covers the display area D of the display means 19.

The holding member 12 on the lower surface side may have a structure of covering the whole back surface of the display device. In an example shown in FIG. 2(A), however, the holding member 12 of the lower surface side is provided with a large window 12a to decrease the total weight of the display device.

The starting circuit 17 drives the fluorescent tubes 13 to emit light which is then guided to the light-guide plate 14 by the fluorescent tube reflection sheets 22, diffused into light of equal intensity by the light-guide plate reflection sheet 21, and is emitted onto the surface of the light-guide plate 14. The light uniformly emitted from the light-guide plate 14 makes it possible to recognize the content displayed by the display means 19 that is driven by the display circuit 16.

FIG. 3 is a back view of another conventional display device. In the case of this display device, the holding member 12 of the lower surface side has the structure of a cleat to reinforce the display device and has a plurality of small windows 12a to reduce the weight.

In recent years, advanced technology in fluorescent tube 13 and turn-on circuit 17 made it possible to emit light in amounts larger than ever before. Therefore, the temperature is higher than ever before at both ends of the fluorescent tube 13; i.e., the temperature being higher at portions close to the fluorescent tube 13 in the light-guide plate 14 and being lower at portions remote from the fluorescent tube 13. That is, the temperature variance in the light-guide plate 14 becomes greater than ever before.

The display elements 19a of the display means 19 may be greatly affected by the temperature, and the temperature variance in the light-guide plate 14 may cause a variance in the display element 19a and seriously impair the display quality of the display device.

That is, in the above-mentioned conventional planar display device, the light-guide means is usually made up of an acrylic resin material which has a low heat conductivity.

As shown in FIG. 2(A), 2(B) or 3, therefore, the fluorescent tubes which are light-emitting means produce a high temperature at both sides of the light-guide plate 14 that is the light-guide means. Therefore, the light-guide means 14 is heated only at portions close to the light-emitting means, and the central portion of the light-guide means 14 remains at a low temperature.

That is, temperature distribution takes place in the light-guide plate 14 which is the light-guide means.

Here, in general, the liquid crystal which constitutes the display means exhibits an operating speed for transmitting light or interrupting light that generally varies depending upon the temperature, i.e., ON/OFF speed.

FIG. 4 is a graph in which the relationship between the voltage (V volt) of the liquid crystal display element and the light transmittance factor (T%) is plotted with the temperature as a parameter, and wherein a solid line represents a change in the case of a low temperature L °C., a dot-dash chain line represents a change in the intermediate temperature M, and a dotted line represents a change in the high temperature H °C. It will be understood from this graph that the light transmittance factor (T%) of the liquid crystal display element greatly varies depending upon the voltage. If a voltage at which a predetermined light transmittance factor (T%) of the liquid crystal is exceeded, is specified to be a threshold voltage Vth, it will be understood that the threshold voltage Vth undergoes a great change depending upon the temperature.

In the conventional display device, when a temperature distribution takes place in the light-guide means 14, e.g., when the temperature becomes high at a portion close to the light-emitting means 13 and low at the central portion as described above, a portion of the the display means 19 close to the light-emitting means 13 becomes dark and the central portion becomes white or vice versa. That is, spots develop on the display screen of the display device to greatly degrade the quality of the display screen. Depending upon the size and thickness of the light-guide plate 14, however, the temperature difference between the ends and the central portion may increase to such a degree that cannot be neglected, since the ends of the light-guide plate 14 receive the heat emitted from the fluorescent tubes 13.

In order to solve the above-mentioned problem, Japanese Unexamined Utility Model Publication (Kokai) No. 4-98030 discloses a structure in which the back surface of a light-guide plate 14 and a fluorescent tube 13 are surrounded by a holding member 12 made of a metal.

FIG. 5 is a sectional view of a display device disclosed in Japanese Unexamined Utility Model Publication (Kokai) No. 4-98030. Two fluorescent tubes 13 are fastened by an adhesive tape 23 to the light-guide plate 14 and are wrapped by a reflection sheet 26 made up of a fluorescent tube reflection sheet 22 and a light-guide plate reflection sheet 21 as a unitary structure, and the holding member 12 on the lower surface side holding the light-guide plate 14 and the fluorescent tubes 13 is intimately adhered to the reflection sheet 26 on the back surface of the light-guide plate 14 without being provided with windows 8 for reducing the weight.

With this constitution, the heat of the fluorescent tubes 13 is nearly uniformly conducted by the holding member 12 on the lower surface side to heat the whole light-guide plate 14 enabling the temperature variance to be decreased in the light-guide plate 14.

In the display device disclosed in Japanese Unexamined Utility Model Publication (Kokai) No. 4-98030, however, though the temperature variance decreases in the light-guide plate 14, the large amount of heat generated by the fluorescent tubes 13 is directly conducted to the light-guide plate 14 via the holding member 12 on the lower surface side. Therefore, the temperature of the whole light-guide plate 14 rises and, hence, the temperature of the display element 19 rises, too. Depending upon the environment in which it is used, therefore, the temperature of the display element 19 often exceeds the upper-limit temperature and the display device is no longer usable. Moreover, the ends of the light-guide plate 14 receive the heat emitted from the fluorescent tubes 13. Depending upon the size and thickness of the light-guide plate 14, therefore, the temperature difference between the end portions and the central portion often becomes so great that it cannot be neglected.

According to the above-mentioned prior art, although the temperature distribution does not take place in the light-guide means 14, the holding means 12, which is a heat conduction means, directly conducts the heat generated by the light-emitting means 13 to the light-guide means 14, so that the temperature rises in the light-guide means 14.

As will be understood from FIG. 4 which is a graph of light transmission factor of the display element of liquid crystal, the rise of the curve becomes less steep as the temperature rises, i.e., the above-mentioned curve at a predetermined voltage becomes flat. This means that the contrast becomes poor on a practical display screen.

The occurrence of such a condition causes the quality of the display screen to be markedly deteriorated.

SUMMARY OF THE INVENTION

A first object of the present invention therefore is to suppress the rise of temperature while making the temperature distribution in the display device uniform. A second object of the present invention is to provide a display device having high display quality and reliability by making the temperature distribution of the display device more uniform.

In order to accomplish the above-mentioned objects, the present invention basically employs the technical constitution that is described below. That is, the display device comprises a planar display means constituted by liquid-crystal display elements, a light-guide means opposed to said display means, a light-emitting means provided at least at an end portion of said light-guide means, a reflection means covering said light-emitting means, and a holding means that holds each said means as a unitary structure, wherein provision is made of a heat conduction means constituted by a member having a large heat conductivity opposed to the surface of said light-guide means of the side opposite to the surface which is opposed to said planar display means, and a mechanism between said heat conduction means and said holding means, said mechanism limiting the conduction of heat between said heat conduction means and said holding means.

According to the structure of the display device of the present invention, the heat conduction plate disposed on the back surface of the light-guide plate is made of a member having a high heat conductivity enabling the temperature distribution to be nearly uniform. Therefore, temperature variance decreases in the light-guide plate and in the display means. Moreover, since a gap is provided between the holding member that conducts the heat of the fluorescent tube and the heat conduction plate, the temperature of the heat conduction plate rises only a little and the temperature can be reduced in the light-guide plate and in the display means. Accordingly, even when a display means susceptible to temperature is used, the display quality of the display device is not impaired, and the device can be used at a high temperature.

BRIEF DESCRIPTION OF THE DRAWINGS

FIGS. 1(A) and 1(B) are diagrams illustrating the constitution of a display device according to an embodiment of the present invention, wherein FIG. 1(A) is a back view illustrating the embodiment of the invention and FIG. 1(B) is a sectional view thereof;

FIGS. 2(A) and 2(B) are diagrams illustrating the constitution of a conventional display device, wherein FIG. 2(A) is a back view of the conventional display device and FIG. 2(B) is a sectional view thereof;

DETAILED DESCRIPTION OF THE PREFERRED EMBODIMENTS

Embodiments of the display device according to the present invention will now be described in detail with reference to the drawings.

Figure 1A:
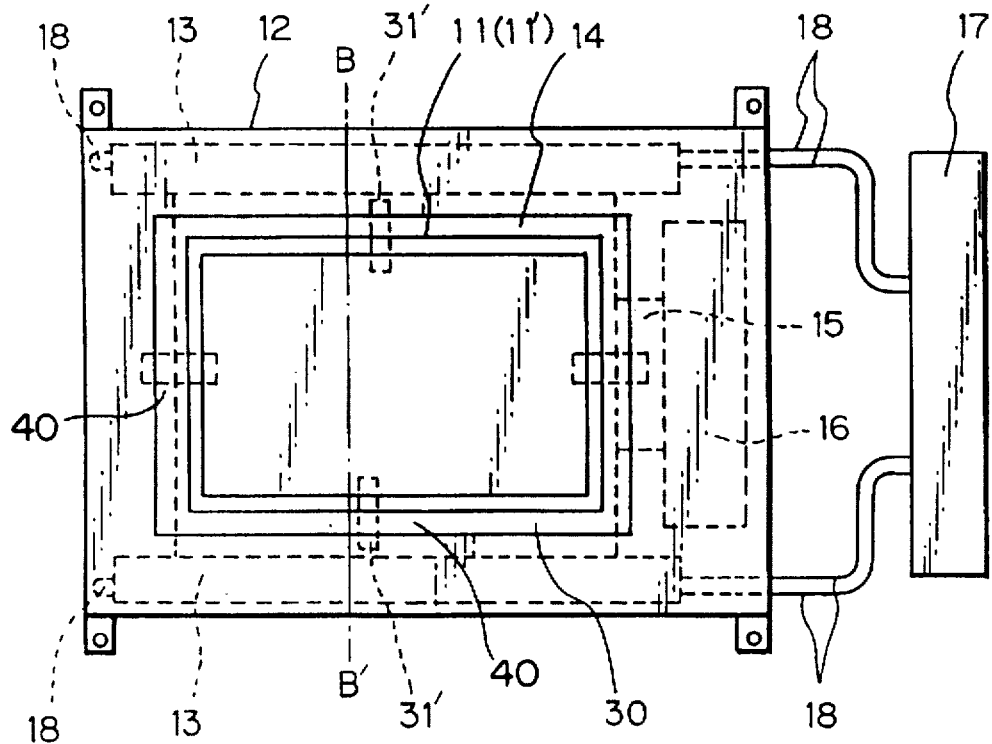
Figure 1B:
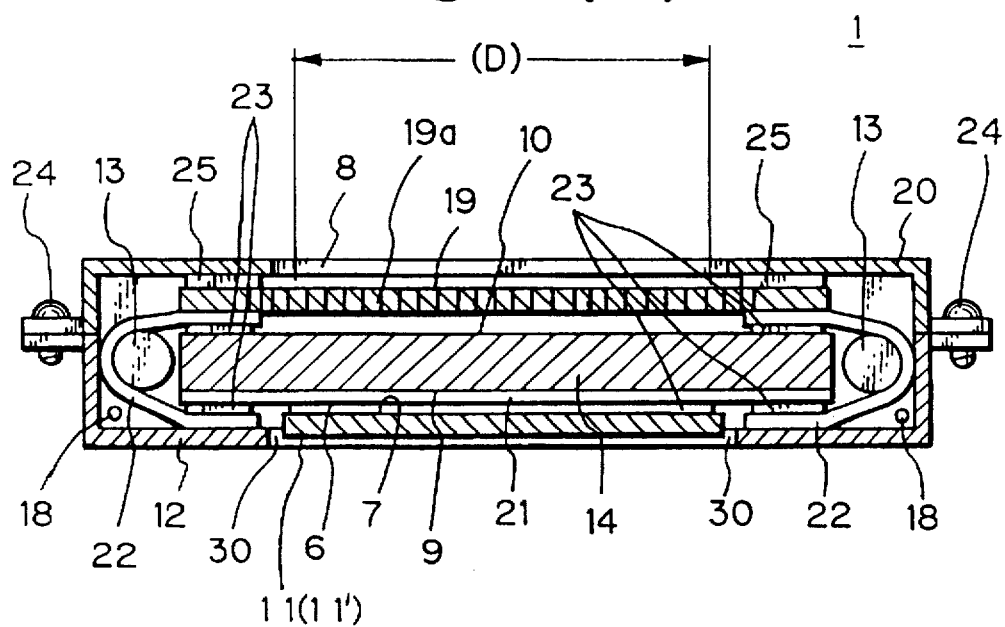
Figure 2A:
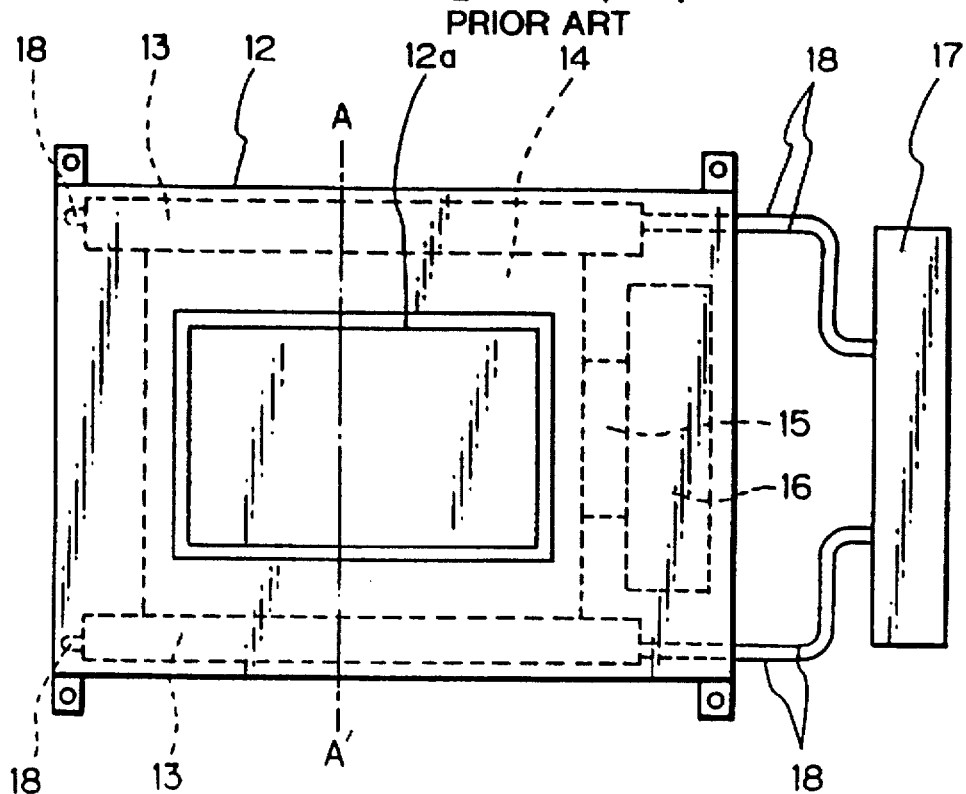
Figure 2B:
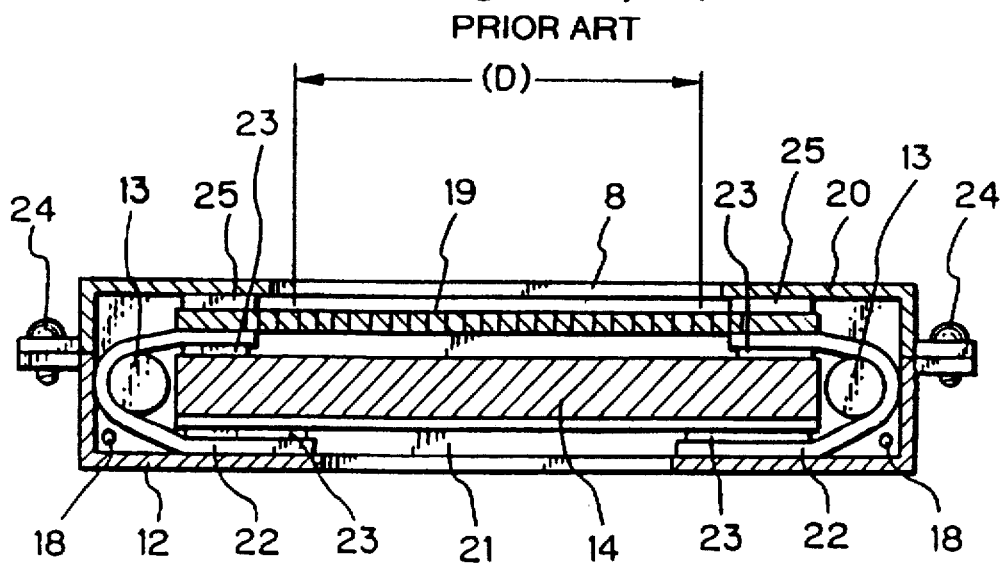
Figure 3:
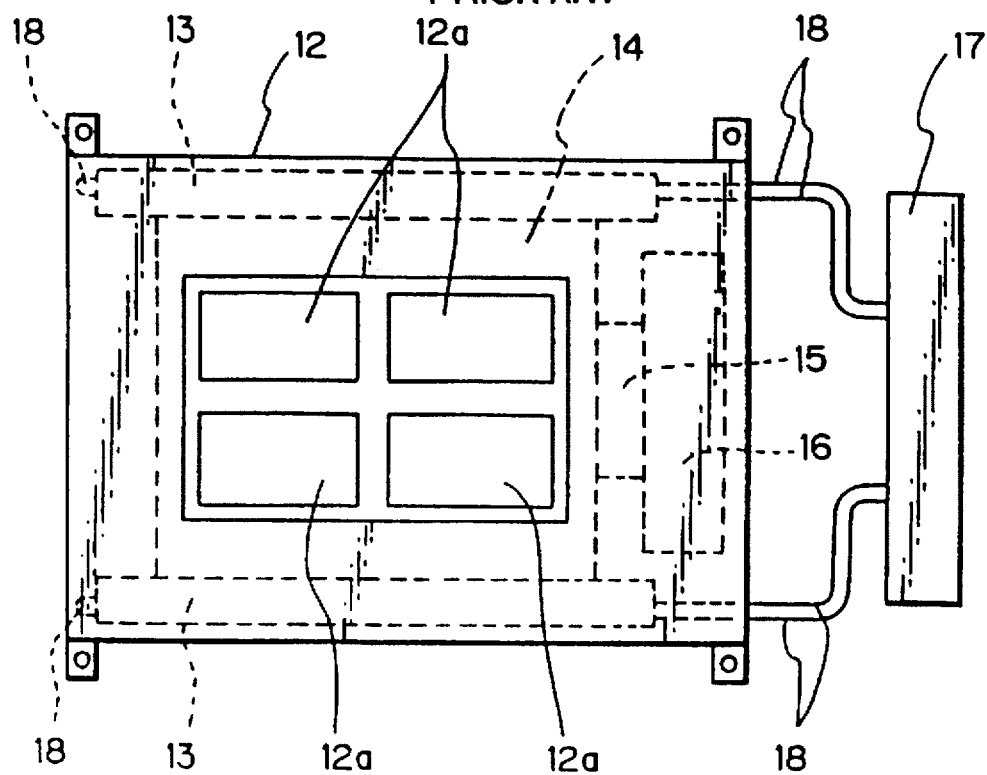
FIG. 3 is a back view illustrating the constitution of another conventional display device.
Figure 5:
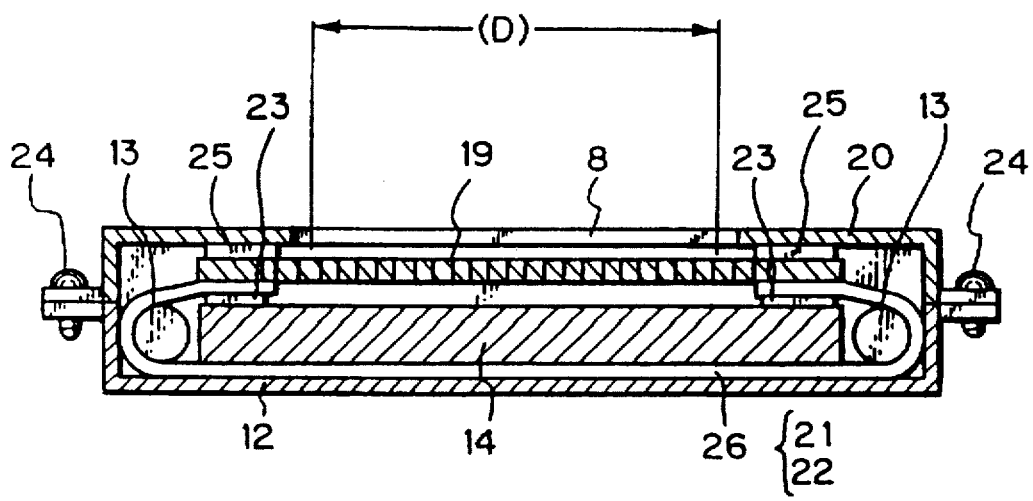
FIG. 5 is a sectional view illustrating the constitution of a further conventional display device.
Figure 4:
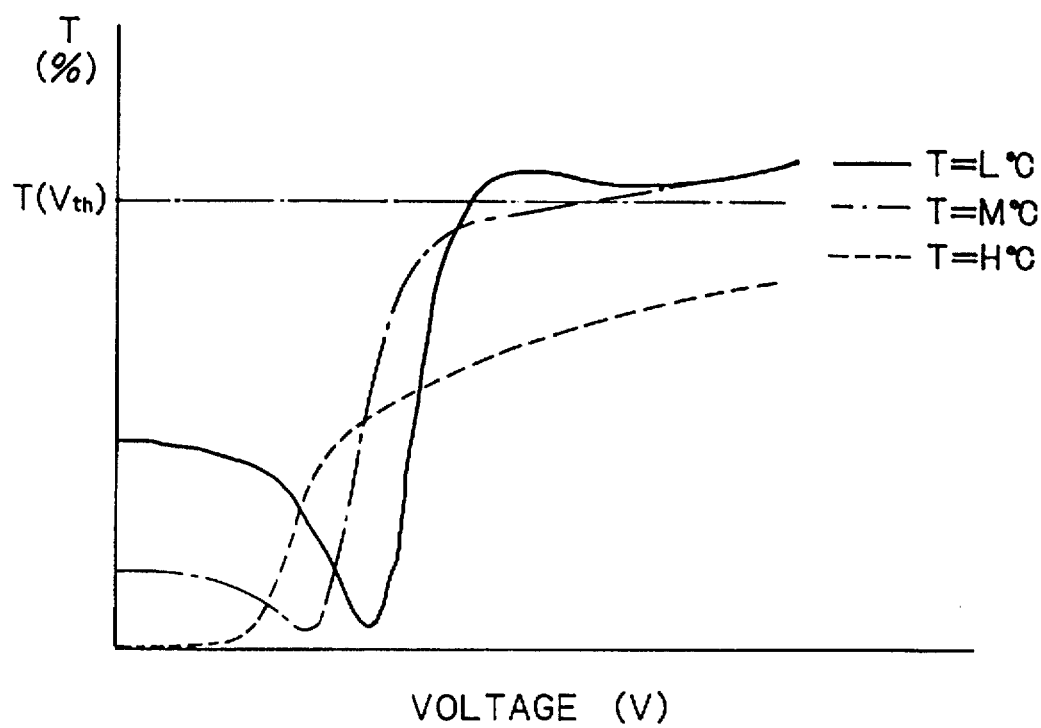
FIG. 4 is a graph showing light transmission characteristics of a liquid-crystal display element that is used in the display device.

FIGS. 1(A) and 1(B) are diagrams illustrating a display device having a basic constitution according to an embodiment of the present invention, wherein FIG. 1(A) is a back view thereof and FIG. 1(B) is a sectional view thereof.

Referring to FIG. 1(A) and FIG. 1(B), a display device 1 comprises a planar display means 19 constituted by a plurality of liquid-crystal display elements 19a, a light-guide means 14 opposed to said display means 19, a light-emitting means 13 provided at least at an end portion of said light-guide means 14, a reflection means 22 covering said light-emitting means 13, and a holding means 12 that holds said means 19, 14 and 13 as a unitary structure, wherein provision is made of a heat conduction means 11 constituted by a member having a large heat conductivity opposed to the surface 9 of said light-guide means 14 at the side opposite to the surface 10 which is opposed to said planar display means 19, and a mechanism 40 between said heat conduction means 11 and said holding means 12, said mechanism 40 limiting the conduction of heat between said heat conduction means 11 and said holding means 12.

In FIG. 1(A) and FIG. 1(B), reference numeral 8 denotes a display opening formed in the holding means 12, and 21 denotes a light-guide plate reflection sheet that is intimately adhered to the light-guide means 14.

The light-guide means 14 and two light-emitting means 13 are secured by a fluorescent tube reflection sheet 22 which is a reflection means.

According to the basic technical idea of the present invention, the temperature distribution is uniform over the light-guide means 14 and, at the same time, the temperature of the light-guide means 14 is maintained at a value which is best suited for the threshold value (Vth) of the liquid-crystal display elements 19a which constitute the display means 19. For this purpose, the heat conduction means 11 having a predetermined area is provided on the light-guide means 14. The heat conduction means 11 suppresses the degree by which the heat energy produced by the light-emitting means 13 provided at least at an end portion of the light-guide means 14 is conducted directly to the heat conduction means 11, so that an increased amount of energy is conducted to the heat conduction means 11 through a side path formed along a side edge of the heat conduction means 11 as a detoured heat path in a detouring manner. Balance is maintained between a temperature at the central portion of the light-guide means 14 and a temperature at a portion of the light-guide means 14 close to the light-emitting means, in order to make the temperature distribution in the light-guide means 14 uniform.

Figure 6:
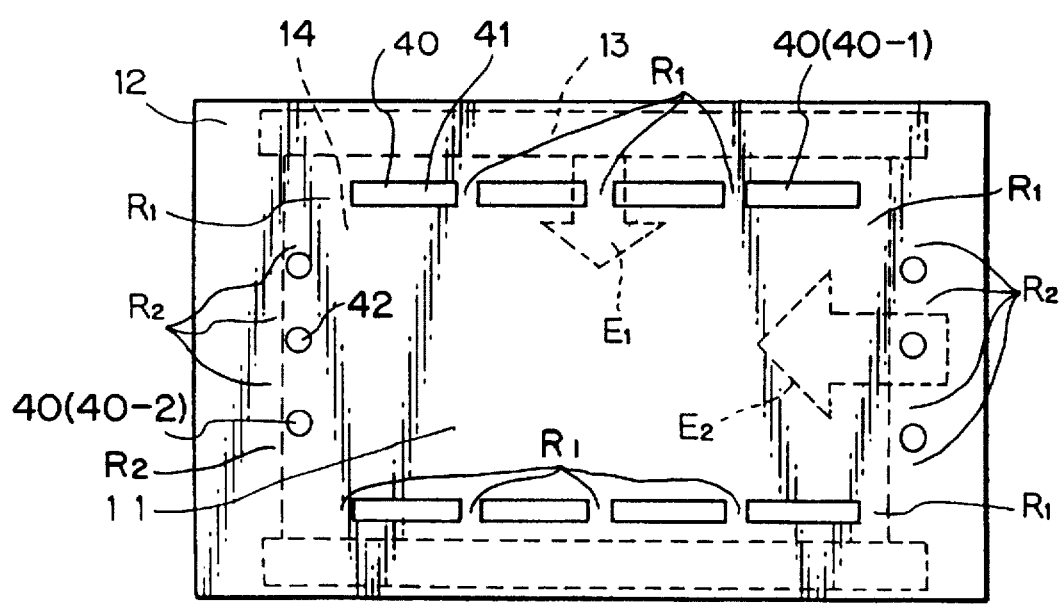
FIG. 6 is a diagram illustrating the constitution of a mechanism that limits the conduction of heat employed by the display device of the present invention and an arrangement thereof.
Figure 1A:
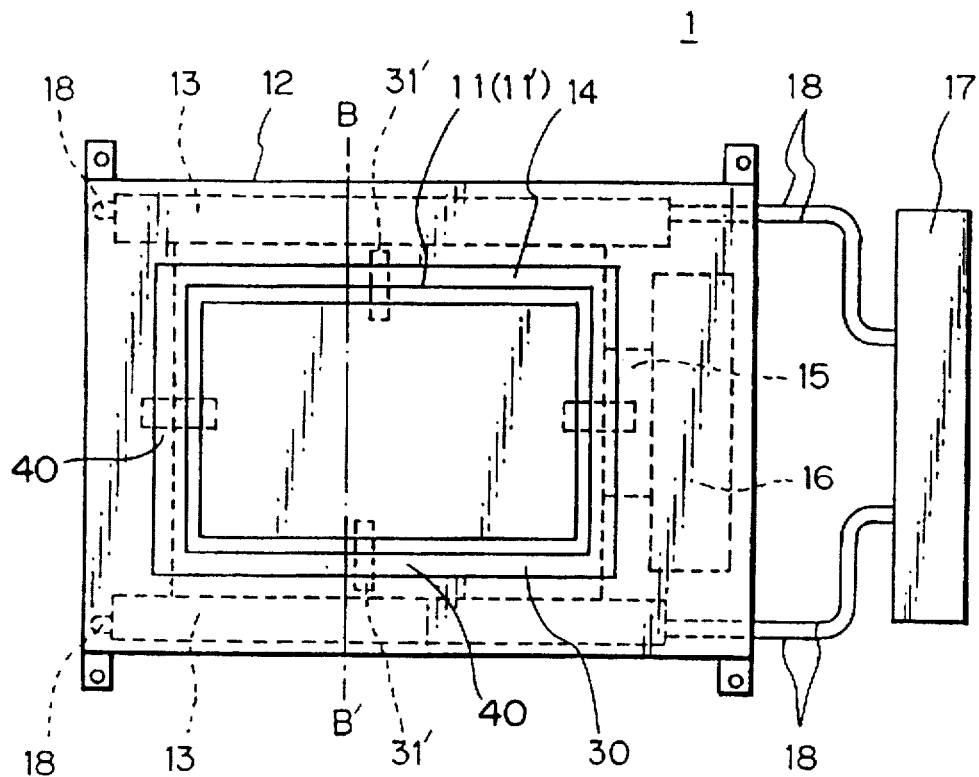
Figure 1B:
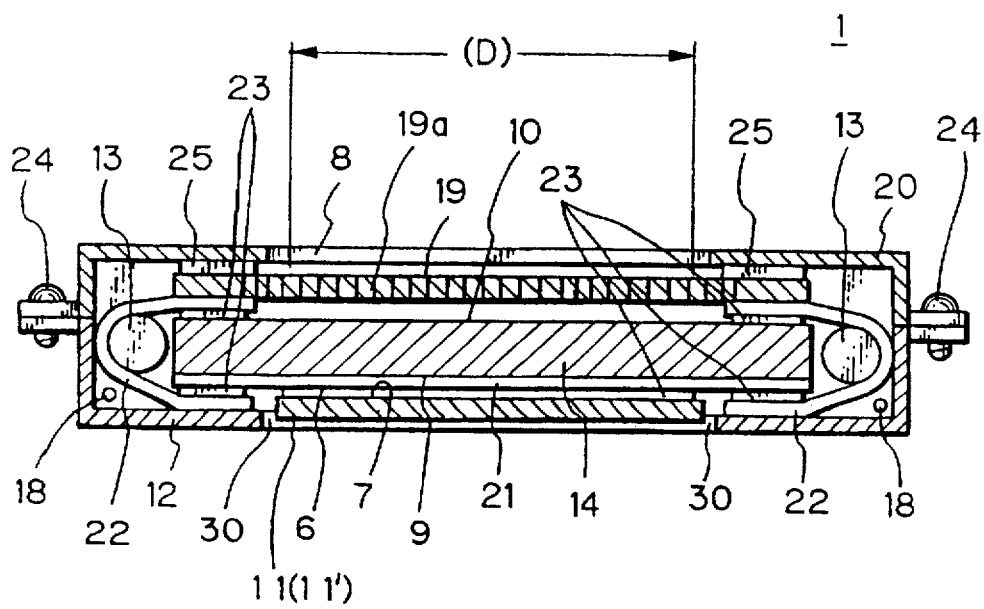
Figure 2A:
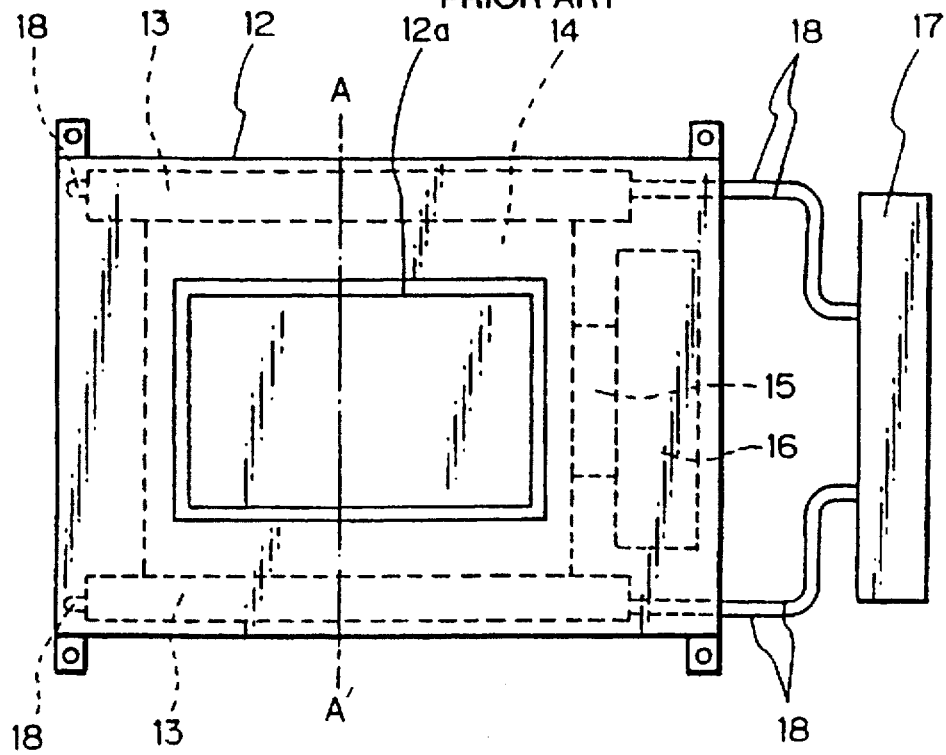
Figure 2B:
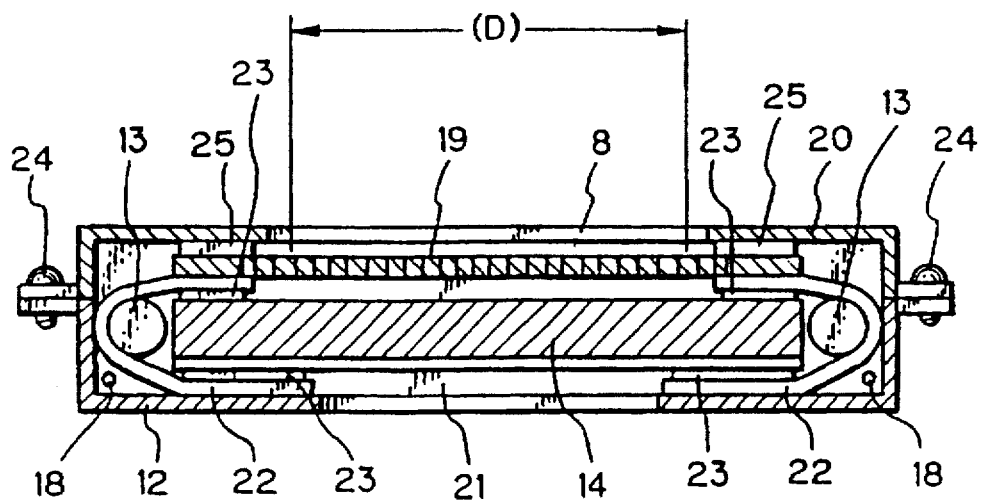
Figure 3:
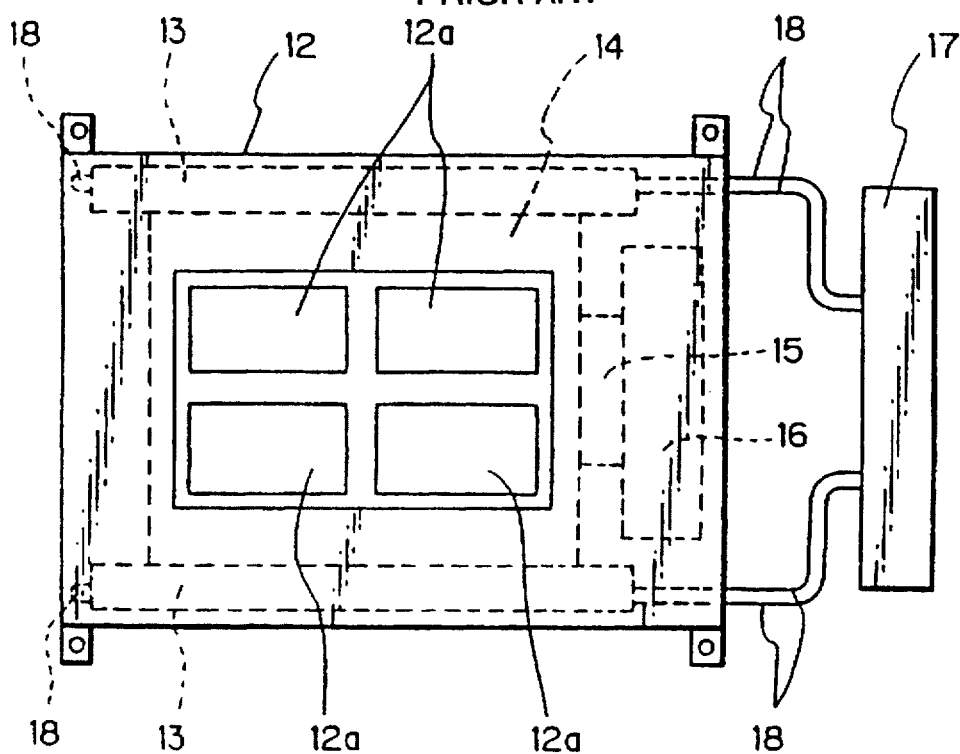
Figure 5:
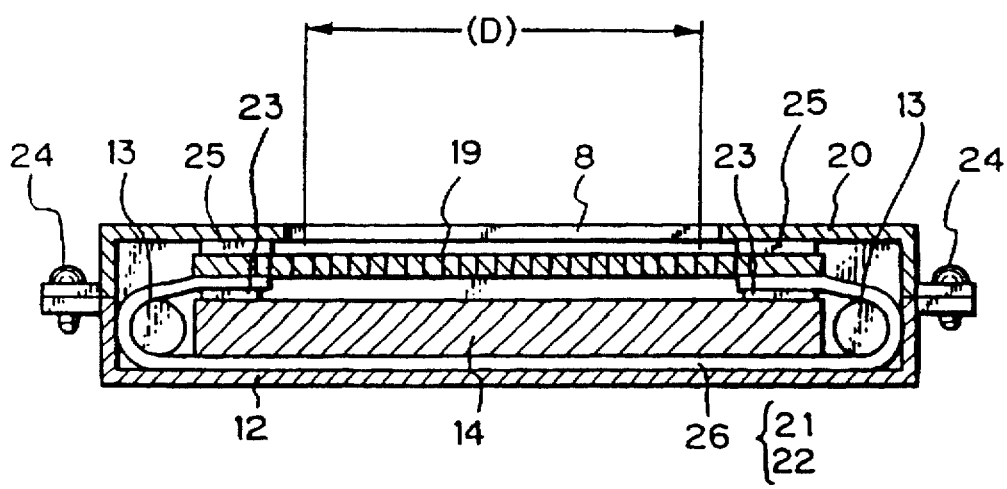
Figure 4:
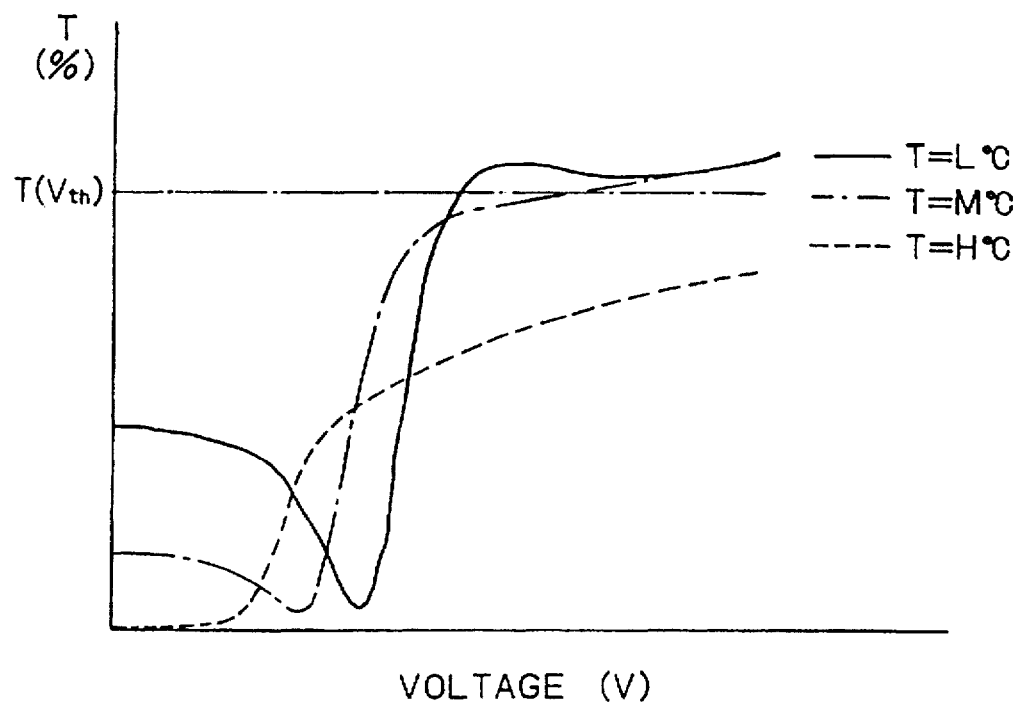
Figure 6:
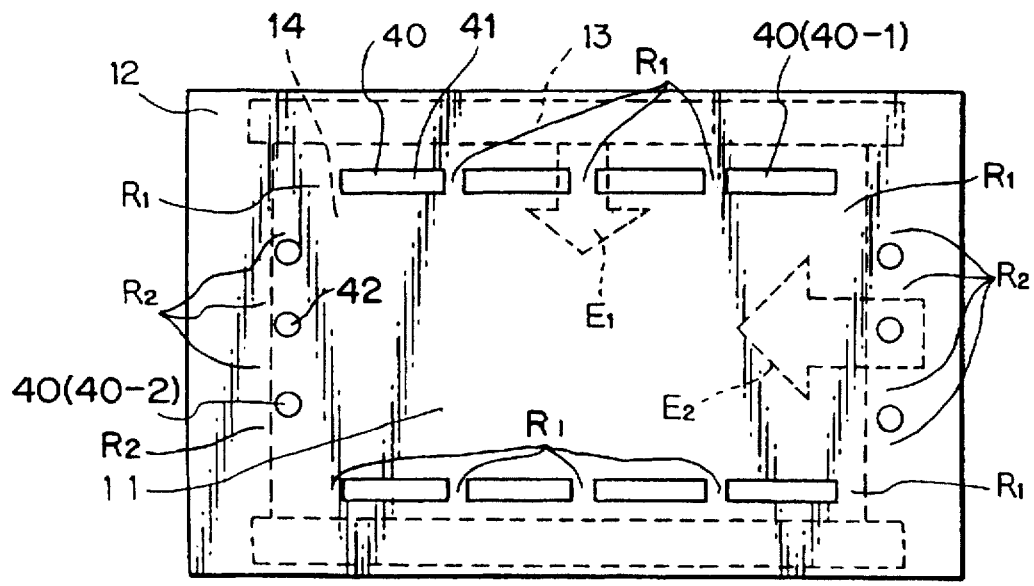

According to the present invention as shown in FIG. 6, therefore, a feature resides in the provision of a mechanism 40 between the heat conduction means 11 and the holding means 12 as described above, in order to limit the conduction of heat between the heat conduction means 11 and the holding means 12. As described above, furthermore, the mechanism 40 so works that the energy from the light guide means flows in a larger amount into the heat conduction means 11 via a portion R2 of the light-guide means 14 which is positioned between the heat conduction means 11 and the holding means 12 in a direction at right angles with the light-emitting means 13 than the energy E1 from the light guide means that flows into the heat conduction means 11 via a portion R1 which is close to the light-emitting means 13 and is in parallel with the light-emitting means 13.

Therefore, when the mechanisms 40 are provided between the heat conduction means 11 and the holding means 12 to limit the conduction of heat, or concretely speaking, when the mechanisms are provided in a portion R1 close to the light-emitting means 13 and in a direction in parallel with the light-emitting means 13 and in a portion R2 in a direction at right angles with the light-emitting means 13 between the heat conduction means 11 and the holding means 12, it is desired that the mechanism 40-1 provided in the portion R1 close to the light-emitting means 13 and in the direction in parallel with the light-emitting means 13 has the ability of limiting the conduction of heat which is greater than the ability of limiting the conduction of heat of the mechanism 40-2 that is provided in the portion R2 in the direction at right angles with the light-emitting means 13.

Next, according to the present invention, the mechanism 40 for limiting the heat conduction between the heat conduction means 11 and the holding means 12 is predominantly provided in at least the portion R1 which is positioned between the heat conduction means 11 and the holding means 12 and is close to the light-emitting means 13. Depending upon the case, the mechanism 40 for limiting the heat conduction may not be provided in the portion R2 in a direction at right angles with the light-emitting means 13.

The light-guide means 14 used in the present invention is a plate-like member made of a material having a small heat conductivity such as an acrylic synthetic resin.

Moreover, it is desired that the light-emitting means 13 used in the present invention is, for example, a fluorescent tube.

Furthermore, the heat conduction means 11 used in the present invention is plate-like member made of a material having a high heat conductivity such as iron, copper, aluminum or the like.

It is desired that the reflection means 22 that covers the light-emitting means 13 used in the display device of the present invention is a reflecting sheet.

Though there is no particular limitation, the heat conduction means 11 used in the present invention should have a size which is equal to the area of the planar display means 19 or is smaller than the area of the planar display means, or may have a large size as will be described later.

It is desired that the mechanism 40 that limits the conduction of heat between the heat conduction means 11 and the holding means 12 is the one selected from a gap, a slit 41, a hole 42, a window or the like provided between the heat conduction means 11 and the holding means 12.

That is, the mechanism 40 that limits the conduction of heat in the present invention limits the degree by which the heat energy is conducted to the heat conduction means 11 from the light-emitting means 13. The larger the number of gaps, slits 41, holes 42, windows 49 or the like, the greater the degree for limiting the conduction of heat energy.

Ideally, therefore, it is desired as shown in FIG. 1(A) that the heat conduction means 11 is completely separated from the holding means 12, and a gap 30 or a slit 41 is continuously formed to surround the periphery of the heat conduction means 11.

FIG. 1(B) is a sectional view illustrating the constitution of the embodiment, wherein the heat conduction means 11 is constituted separately from the holding means 12, and is directly connected to the opposing surface of the light-guide means 14 or to the light-guide reflection sheet 21 using a junction means such as an adhesive tape or the like.

With this constitution only, however, a predetermined amount of heat energy is not conducted to the heat conduction means 11 from the light-emitting means 13. As shown in FIG. 1(A) and FIG. 1(B), therefore, heat conduction assist means 31 is provided at suitable positions of the gap 30 to connect the holding means 12 and the heat conduction means 11 together.

It is desired that the heat conduction assist means 31 is provided in a number of at least one in the gap 30 which is the mechanism 40-2 for limiting the conduction of heat provided in at least the portion R2 in a direction at right angles with the light-emitting means 13.

The heat conduction assist means 31 has a function of connecting and holding the holding means 12 and the heat conduction means 11 in a fixed manner.

There is no particular limitation in the number of the heat conduction assist means 31. The heat conduction assist means 31 may be provided in a number of one or more as required.

In order to firmly hold the heat conduction means 11, furthermore, the heat conduction assist means 31' may further be provided even in the gap 30 which is the mechanism 40-1 for limiting the conduction of heat provided in at least the portion R1 in a direction in parallel with the light-emitting means 13.

In this case, it is desired that the number of the heat conduction assist means 31' provided in the gap 30 in the portion R1 in the direction in parallel with the light-emitting means 13 is smaller than the number of the heat conduction assist means 31 provided in the gap 30 in the portion R2 in the direction at right angles with the light-emitting means 13.

When it becomes necessary to provide the heat conduction assist means 31 in the same number in both of these portions, it is desirable that the heat conduction assist means 31' provided in the gap in the portion R1 in the direction in parallel with the light-emitting means 13 has a width which is smaller than the width of the heat conduction assist means 31 provided in the gap 30 in the portion R2 in the direction at right angles with the light-emitting means 13.

As described above, the mechanism 40 that limits the conduction of heat of the present invention is constituted by gaps 30, slits, independently formed holes, windows or the like. The sizes, lengths and distances among them can be arbitrarily changed to set the conditions that perfectly satisfy the function of the mechanisms for limiting the conduction of heat by the same method as the one described above. It is further allowable to form the gaps 30, slits, holes and windows in a mixed manner.

According to the present invention, the holding means 12 and the heat conduction means 11 may be constituted by different members or by the same member.

In the present invention, when the holding means 12 and the heat conduction means 11 are constituted by the same member, they can be formed as a unitary structure from the same material by the punching method. In this case, the gaps 30, slits, holes or windows are arranged in a suitable number at the predetermined portions between the holding means and the heat conduction means 11. In the case of the gaps 30 or slits, the heat conduction assist means 31 are formed at the same time. Therefore, the gaps or slits are formed discretely.

Therefore, the width of the gaps or slits, or the distance between the windows or holes, can be designed under nearly the same conditions as those of the width and distance of the heat conduction assist means.

According to the present invention, it is desired that a reflection paint 6 is applied or printed onto the surface 7 of the heat conduction means 11 opposed to the light-guide means 14.

Employment of the above-mentioned constitution makes it possible to omit the light-guide plate reflection sheet 21 that has heretofore been spread on the surface 9 of the light-guide means 14 opposed to the heat conduction means 11, as well as to intimately adhere the heat conduction means 11 onto the light-guide means 14.

In the planar display device according to the present invention, heat is generated when the fluorescent tube 13 is turned on, and the temperature rises at the ends of the light-guide plate 14 due to the heat radiated from the heat conduction plate 11' via the light-guide plate 14 and the holding member 12 on the lower surface side. The light-guide plate 14 and the light-guide plate reflection sheet 21 are both made of a resin and have low heat conductivity. Therefore, the temperature difference becomes great between the ends of the light-guide plate 14 and the central portion of the light-guide plate 14. However, the heat conduction plate 11' having a large heat conductivity that is located close thereto makes it possible to decrease the temperature between the ends and the central portion of the light-guide plate 14. Moreover, the heat of the fluorescent tube 13 conducted to the holding member 12 of the lower surface side is further conducted to the heat conduction plate 11' via the air layer of low heat conductivity in the gap 30. Therefore, the heat is not conducted in such an amount that it raises the temperature of the heat conduction plate 11'.

In Table 1 are listed heat conductivities of the materials that can be used as the heat conduction means 11. In FIGS. 1(A) and 1(B), the effect is obtained to a sufficient degree even when the heat conduction plate 11' is made of iron which has a heat conductivity of 62.5. However, a greater effect is obtained when use is made of aluminum or copper having a larger heat conductivity. When the heat conduction plate 11' is made of aluminum, furthermore, the thickness of the heat conduction plate 11' can be decreased to one-third to obtain the same capacity of heat conduction as that of iron. Moreover, since aluminum has a specific gravity which is about one-third that of iron, the weight can be decreased into about one-ninth.

TABLE 1

| Vinyl chloride: | about 0.2 |
| Acrylic resin: | about 0.2 |
| Iron: | 62.5 |
| Aluminum: | 196 |
| Copper: | 332 |

(Kcal/m·hr·°C.)

In the aforementioned embodiment shown in FIGS. 1(A) and 1(B), the temperature is nearly uniformly distributed in the display means 19 and the temperature rises little.

As indicated by a broken line in FIG. 1(A), therefore, provision is made of heat conduction assist means 31 to feed the heat from the holding member 12 of the lower surface side to nearly the central portion of the heat conduction plate 11'.

Then, the heat of the fluorescent tube 13 conducted to the holding member 12 of the lower surface side is further conducted to the heat conduction plate 11 via the heat conduction assist means 31 to raise the temperature at the central portion of the light-guide plate 14. Therefore, the central portion of the light-guide plate 14 where the temperature is lower than that of both ends of the light-guide plate 14 that receive the heat emitted from the fluorescent tubes 13, is now heated by the heat conducted to the heat conduction plate 11' via the heat conduction assist means 31, enabling the temperature to be further uniformly distributed in the light-guide plate 14.

The amount of heat conducted to the heat conduction plate 11' via the heat conduction assist means 31 can be controlled by changing the width, length, position or number of the heat conduction assist means 31. By suitably selecting them, them, therefore, the temperature distribution can be optimized in the light-guide plate 14.

In FIGS. 1(A) and 1(B), furthermore, the heat conduction plate 11' has a size which is slightly greater than the display area (D) of the display device. The temperature distribution in the light-guide plate 14 changes depending upon the size of the heat conduction plate 11', too. Therefore, the size of the heat conduction plate 11' may be decreased to be smaller than the display area (D) of the display device depending upon the amount of heat generated by the fluorescent tubes 13, size of the light-guide plate 14, etc.

In this case, the heat conduction assist means 31 can be a portion of the holding member 12 of the lower surface side or of the heat conduction plate 11', and mutual mechanical and thermal connections can be maintained therebetween by imparting a suitable resiliency thereto. Depending upon the case, the contact between the heat conduction plate 11' and the light-guide plate reflection sheet 21 may be obtained by relying upon the above-mentioned resiliency and omitting the adhesive tape 23 that is interposed between the heat conduction plate 11' and the light-guide plate reflection sheet 21.

Figure 7:
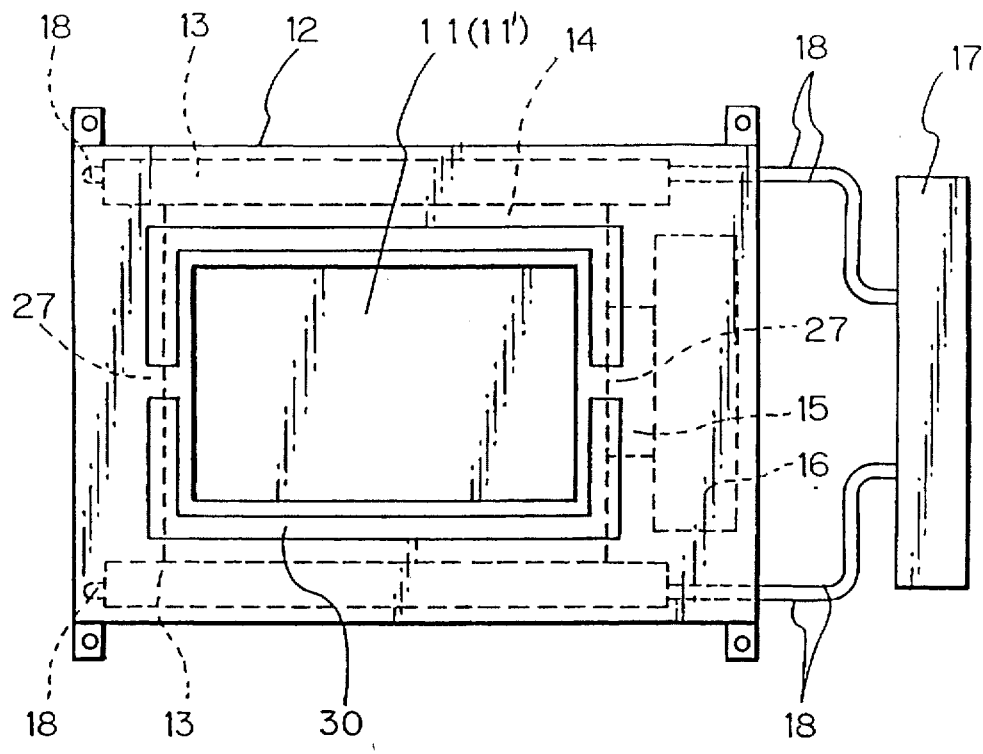
FIG. 7 is a back view illustrating the constitution of the display device according to another embodiment of the present invention.

FIG. 7 is a back view of the display device 1 according to another embodiment of the present invention. In FIG. 7, the heat conduction plate 11' and the holding member 12 of the lower surface side that holds the light-guide plate 14 and the fluorescent tubes 13, are also made of a material having a large heat conductivity, and a gap 30 is formed except at two places at an equal distance from the two fluorescent tubes 13 where the heat conduction plate 11' and the holding member 12 of the lower surface side are connected through connection portions 27.

In this embodiment, the heat conduction assist means 31 of FIG. 1(A) also functions as a connection portion. The action of the connection portion 27 is the same as that of the heat conduction assist means 31 of FIG. 1(A) and is not described here. Here, however, the connection portion may have resiliency so that the heat conduction plate 11' is brought into pressed contact with the light-guide plate reflection sheet 21.

As described above, the heat conducted to the heat conduction plate 11' via the connection portion 27 can be controlled by changing the width, length, position or number of the connection portions 27. By suitably selecting them, the temperature distribution can be optimized in the lights-guide plate 14.

In the embodiment of FIG. 7, the heat conduction plate 11' and the holding member 12 of the lower surface side are made of the same material, and can be molded as a unitary structure using one metal mold, making it possible to decrease the initial cost required for the metal mold, to decrease the number of assembling steps since these parts are molded as a unitary structure, to facilitate the assembly operation and to decrease the cost.

Figure 8:
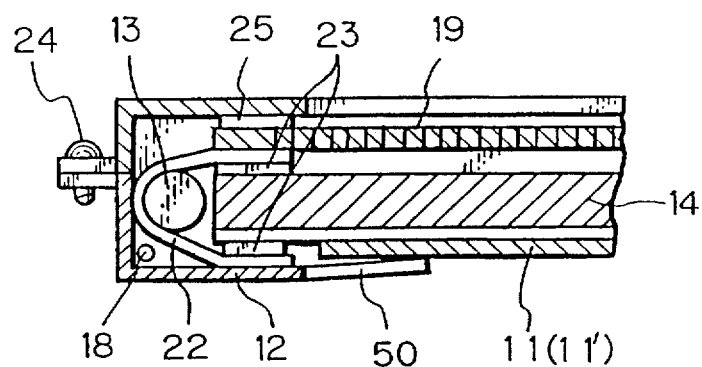
FIG. 8 is a back view illustrating the constitution of the display device according to a further embodiment of the present invention.

That is, as shown in FIG. 8, a protuberance 50 having resiliency is provided at a suitable position on the inner peripheral portion of the holding means 12 of the display device 1 in order to impart a biasing force to the heat conduction means 11 to press the heat conduction means 11 toward the light-guide means 14 at all times.

The protuberance 50 also functions as the heat conduction assist means 31, and its position and its arrangement should be restricted by the limitation related to the heat conduction assist means or to the distance between the windows or holes or to the width between the gaps or slits, as a matter of course.

Figure 9:
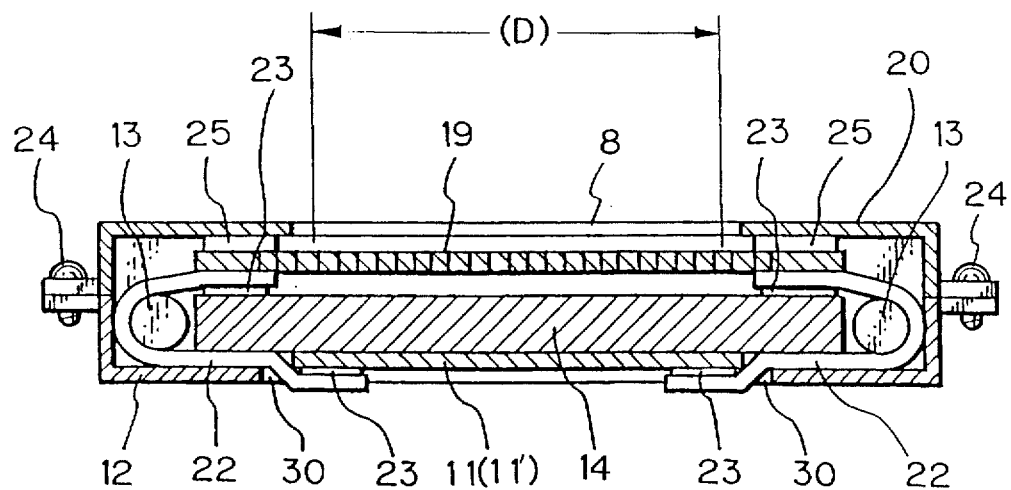
FIG. 9 is a back view illustrating the constitution of the display device according to a still further embodiment of the present invention.

FIG. 9 is a sectional view of the display device according to a further embodiment of the present invention. A reflection paint is applied or printed onto the surface of the heat conduction plate 11' having a large heat conductivity which is then provided on the back surface of the light-guide plate 14 to omit the light-guide plate reflection sheet 21. The fluorescent tube reflection sheet 22 is secured using the adhesive tape 23 to the light-guide plate 14 and to the heat conduction plate 11' by wrapping the fluorescent tube 13. Since the reflection layer is provided on the whole back surface of the light-guide plate 14, the light utilization efficiency is enhanced. Here, the fluorescent tube reflection sheet 22 has a small heat conductivity as described earlier, and the temperature of the heat conduction plate 11' rises little.

The heat conduction plate 11 can be fastened to the light-guide plate 14 by the methods described for the embodiments of FIGS. 1(A) and 1(B) or FIG. 7. The resiliency of the heat conduction assist means 31' may be utilized or the resiliency of the connection portion 27 may be utilized.

The light-guide plate 14 and the holding member 12 of the lower surface side holding the two fluorescent tubes 13, are so shaped as to maintain a gap 30 relative to the heat conduction plate 11'. The temperature difference can be decreased between the ends and the central portion of the light-guide plate 14 since the heat conduction plate 11' having a large heat conductivity is located close thereto as in the aforementioned embodiments. Owing to the presence of the gap 30, furthermore, the temperature of the heat conduction plate 11' does not rise. Moreover, since the light-guide plate reflection sheet 21 used in the aforementioned embodiments is not used in this embodiment, it is possible to decrease the cost of the material, the number of the assembling steps and the cost.

Figure 10:
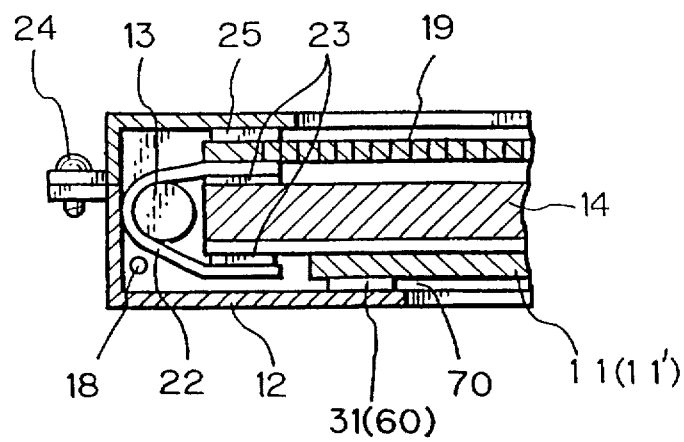
FIG. 10 is a back view illustrating the constitution of the display device according to another embodiment of the present invention.

Next, described below with reference to FIG. 10 is the constitution of the display device according to a still further embodiment of the present invention.

That is, FIG. 10 shows the display device in which the holding means 12 and the heat conduction means 11 are superposed one upon the other at the peripheral portions thereof, and the heat conduction assist means 31 exists as a spacer 60 at a predetermined portion in the superposed portion to form a gap or slit 70 between the holding means 12 and the heat conduction means 11.

It is desired that the heat conduction assist means 31 is provided in a number of at least one in the gap or slit 70 that is formed at least in the portion R2 in the direction at right angles with the light-emitting means 13. It is further desired that the heat conduction assist means 31 is provided in a number of at least one in the gap or slit 70 formed in the portion R1 as indicated in FIG. 6, in the direction in parallel with the light-emitting means 13. Here, it is desired that the number of the above heat conduction assist means 31 is smaller than the number of the heat conduction assist means 31 that are provided in the gap or slit 70 formed in the portion R2 as indicated in FIG. 6, in the direction at right angles with the light-emitting means 13.

Moreover, it is desired that the heat conduction assist means 31 or the spacer provided in the gap or slit 70 formed in the portion R1 in the direction at right angles with the light-emitting means 13, has a width which is narrower than the width of the heat conduction assist means 31 that is provided in the gap or slit 70 formed in the portion R2 in the direction at right angles with the light-emitting means 13.

In the above description of the embodiments of the present invention, the display means 19 was assumed to be a liquid-crystal display element. The display means 19, however, may be the one other than the liquid-crystal display element provided the display device employs the illumination device and the light-guide plate. The heat conduction plate can be mounted by employing a structure in which the heat conduction plate is held by the holding portion of the lower surface side via the insulating material or by employing a means which secures the heat conduction plate from the back surface thereof using a one-sided adhesive tape.

In the above description, the fluorescent lamps 13 are located on both sides of the display means 19. Accordingly, the heat conduction assist means 31' of FIG. 1(A) and the connection portions 27 of FIG. 7 are located nearly at intermediate positions of the two fluorescent tubes. In other display devices, however, the fluorescent tube 13 may be provided on one side only of the display means 19. In such a case, the heat conduction assist means 31' or the connection portion 27 will be located at a position most remote from the fluorescent tube 13 as a matter of course.

According to the present invention as described above, a heat conduction plate 11 having a large heat conductivity is provided on the back surface of the light-guide plate 14, and a gap is provided between the heat conduction plate 11 and the holding member 12 that holds the fluorescent tube 13 or the light-guide plate 14. Therefore, the temperature rise is suppressed in the light-guide plate and the temperature variance is decreased on the surface of the light-guide plate. Even when a display element susceptible to the temperature is used, therefore, the quality of the display device does not fall.

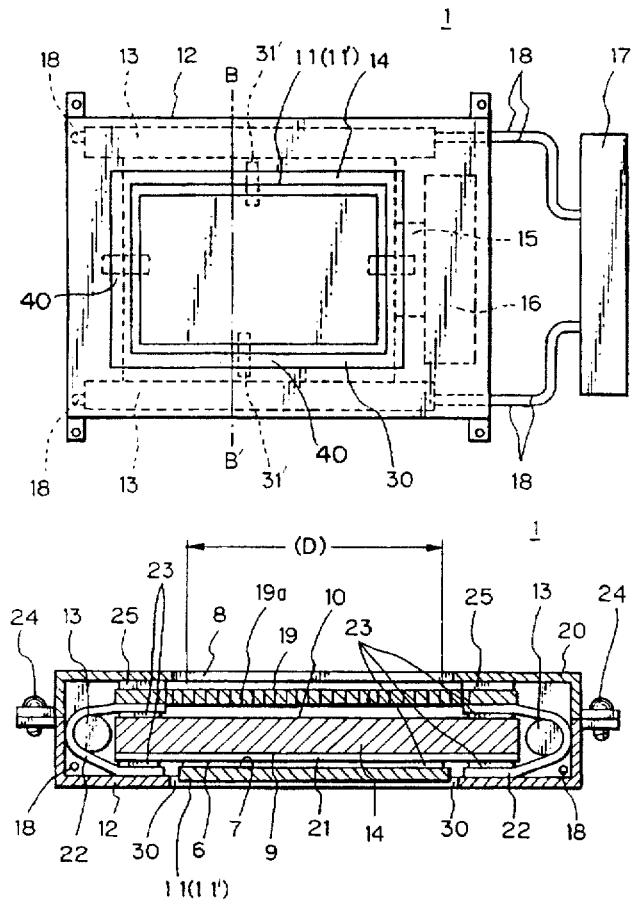

I claim:

1. A display device including a planar display member constituted by liquid crystal display elements, light-guide member opposed to said display member a light-emitting member comprised of a tubular light source provided at least at an end portion of said light-guide member, and a holding member for holding at least said members as a unitary structure wherein said planar display member is arranged at an upper surface of said light guide member, a heat conduction member, said member being a heat conduction means constituted by a member having large heat conductivity is arranged at a lower side of the bottom surface of said light-guide member, and a gap and a heat conduction assist means are arranged at a portion where said heat conduction member and said holding member are arranged next to each other, and wherein uniform display characteristic of said display member is obtained by changing the size or the shape of said gap and said heat conduction assist means.

2. A display device according to claim 1, wherein said light-guide means is a plate configured member made of a material having heat conductivity less than the heat conduction means.

3. A display device according to claim 1, wherein said light-emitting means is a fluorescent tube.

4. A display device according to claim 1, wherein said heat conduction means is a plate configured member made of a material having a large heat conductivity.

5. A display device according to claim 1, wherein said heat conduction means has an area approximately the same as the area of said planar display means.

6. A display device according to claim 1, wherein said reflection means is a reflecting sheet.

7. A display device according to claim 1, wherein the mechanism limiting the conduction of heat between said heat conduction means and said holding means is provided between said heat conduction means and said holding means close to said light-emitting means.

8. A display device according to claim 1 or 7 wherein the mechanism limiting the conduction of heat between said heat conduction means and said holding means, comprises at least one selected from the group consisting of a gap, a slit, a hole, and a window, provided between said heat conduction means and said holding means.

9. A display device according to claim 8, wherein said heat conduction means is directly and intimately adhered to said light-guide means.

10. A display device according to claim 1, wherein the reflection means is applied to a surface of said heat conduction means opposed to said light guide means.

11. A display device according to claim 10, wherein said heat conduction means directly and intimately adheres to said light-guide means.

12. A display device according to claim 1, wherein said heat conduction member and said heat conduction assist means are made of different materials having different characteristics of heat conductivity.

13. A display device according to claim 1, wherein said heat conduction member and said heat conduction assist means are made of the same material.

14. A display device according to claim 13 wherein said heat conduction member and said heat conduction assist means are made of a unitary member.

15. A display device according to claim 1 wherein said heat conduction member, said holding member and said heat conduction assist means are made of the same material.

16. A display device according to claim 15 wherein said heat conduction member, said holding member and said heat conduction assist means are made of a unitary member.

17. A display device according to claim 1 wherein said light-guide member is made of a material having a small conductivity.

18. A display device according to claim 1, wherein at least one of said heat conduction member and said heat conduction assist means are made of a material having a large heat conductivity.

19. A display device according to claim 1, wherein said heat conduction member has an area which is approximately the same as the area of said planar display member.

20. A display device according to claim 1 wherein reflection means is applied onto the surface of said heat conduction means opposed to said light-guide means.

21. A display device, comprising:

planar display means including liquid crystal display elements;

light-guide means having first and second opposite surfaces, said first surface being opposed to said display means;

light-emitting means provided at at least one end portion of said light-guide means;

reflection means covering said light-emitting means;

holding means holding at least one of said planar display means, said light-guide means, said light-emitting means, and said reflection means as a structure;

heat conduction means including a member having large heat conductivity at the structure, and opposed to said second surface of said light-guide means; and a mechanism between said heat conduction means and said holding means close to said light emitting means, said mechanism limiting the conduction of heat between said heat conduction means and said holding means.

wherein the mechanism includes two portions, a first portion close to and parallel with the light-emitting means, a second portion between said heat conduction means and said holding means and perpendicular to the light-emitting means, the first portion having a greater ability of limiting heat conduction than the second portion.

22. A display device according to claim 21 wherein the mechanism limiting the conduction of heat between said heat conduction means and said holding means, comprises any one selected from the group consisting of a gap, a slit, a hole, and a window, provided between said heat conduction means and said holding means.

23. A display device according to claim 22, wherein said holding means and said heat conduction means are made of different materials, and a continuous circular gap is formed between said holding means and said heat conduction means.

24. A display device according to claim 23, wherein a heat conduction assist means is provided in a portion of said continuous circular gap to connect said holding means and said heat conduction means together.

25. A display device according to claim 24, wherein said heat conduction assist means is provided in at least one place in said gap that is formed in at least the portion in the direction at right angles with said light-emitting means.

26. A display device according to claim 25, wherein said heat conduction assist means is provided in at least one place in said gap formed in the portion in the direction parallel with said light-emitting means, and the number of said heat conduction assist means is smaller than the number of heat conduction assist means provided in the gap formed in the portion perpendicular to said light-emitting means.

27. A display device according to claim 25, wherein said heat conduction assist means is provided in at least one place in said gap formed in the portion in the direction in parallel with said light-emitting means, and the width of said heat conduction assist means is narrower than the width of the heat conduction means provided in the gap formed in the portion in the direction at right angles with said light-emitting means.

28. A display device according to claim 22, wherein said holding means and said heat conduction means are made of the same material, and a discrete gap is formed between said holding means and said heat conduction means via heat conduction assist means formed at predetermined portions.

29. A display device according to claim 28, wherein said heat conduction assist means is provided in at least one place in said gap formed in at least the portion in the direction at right angles with said light-emitting means.

30. A display device according to claim 29, wherein said heat conduction assist means is provided in at least one place in the gap formed in the portion in the direction in parallel with the light-emitting means, and the number of said heat conduction assist means is smaller than the number of the heat conduction assist means provided in the gap formed in the portion in the direction at right angles with the light-emitting means.

31. A display device according to claim 29, wherein said heat conduction assist means is provided in at least one place in said gap formed in the portion in the direction in parallel with said light-emitting means, and the width of said heat conduction assist means is narrower than the width of the heat conduction means provided in the gap formed in the portion in the direction at right angles with said light-emitting means.

32. A display device according to claim 24 or 29, wherein said heat conduction assist means has resiliency and imparts a biasing force to said heat conduction means to urge it toward said light-guide means at all times.

33. A display device according to claim 22, wherein said holding means and said heat conduction means are superposed one upon the other at the peripheral portions thereof, and the heat conduction assist means exist as spacers at predetermined portions in the superposed portion to form a gap or slit between said holding means and said heat conduction means.

34. A display device according to claim 33, wherein said heat conduction assist means is provided in at least one place in said gap or slit that is formed in at least the portion in the direction at right angles with said light-emitting means.

35. A display device according to claim 33, wherein said heat conduction assist means is provided in at least one place in said gap or slit formed in the portion in the direction in parallel with said light-emitting means, and the number of said heat conduction assist means is smaller than the number of the heat conduction assist means that are provided in the gap or slit formed in the portion in the direction at right angles with said light-emitting means.

36. A display device according to claim 33, wherein said heat conduction assist means is provided in at least one place in said gap or slit formed in the portion in the direction in parallel with said light-emitting means, and the width of said heat conduction assist means is narrower than the width of the heat conduction means provided in the gap or slit formed in the portion in the direction at right angles with said light-emitting means.

37. A display device including a planar display means constituted by liquid crystal display elements, a light-guide member opposed to said planar display means, a light-emitting member comprised of a tubular light source provided at least at an end portion of said light-guide member, and holding means for holding at least said members as a unitary structure, wherein said planar display means has right angles with the side portion of said light-guide member on which said light-emitting member is arranged, and is arranged at an upper side of the upper surface of said light-guide member, heat conduction means constituted by a member having a large heat conductivity and which has right angles with the side portion of said light guide member on which said light-emitting member is arranged, is arranged at a lower side of the bottom surface of said light-guide member, and a first mechanism for limiting heat conductivity is provided between said heat conduction means and said holding means, a second mechanism for limiting heat conductivity is provided at a portion at right angles with the longitudal direction of the tubular light-emitting member, wherein an ability of limiting heat conductivity of the first mechanism is set to be larger than that of the second mechanism, when said first mechanism is provided at a portion which is close to said light emitting member and is parallel to the longitudinal direction of the tube thereof.

38. A display device according to claim 37, wherein said first mechanism is the one selected from a gap, a slit, a hole, and a window provided between said holding means and said heat conduction means.

39. A display device according to claim 38, wherein said holding means and said heat conduction means are superposed one upon the other at the peripheral portions thereof, and the heat conduction assist means exists as spacers at predetermined portions in the superposed portion to form a three-dimensional gap or slit between said holding means and said heat conduction means.

40. A display device according to claim 39, wherein said heat conduction assist means is provided in at least one place in said three-dimensional gap or slit that is formed in at least the portion in the direction at right angles with said light-emitting means.

41. A display device according to claim 39, wherein said heat conduction assist means is provided in at least one place in said three-dimensional gap or slit that is formed in at least the portion in the direction in parallel with said light-emitting means, and the number of said heat conduction assist means is smaller than the number of the heat conduction assist means that are provided in the three-dimensional gap or slit formed in the portion in the direction at right angles with said light-emitting means.

42. A display device according to claim 39, wherein said heat conduction assist means is provided in at least one place in said three-dimensional gap or slit that is formed in at least the portion in the direction in parallel with said light-emitting means, and the width of said heat conduction assist means is narrower than the width of the heat conduction assist means that are provided in the three-dimensional gap or slit formed in the portion in the direction at right angles with said light-emitting means.

43. A display device according to claim 38, wherein said holding means and said heat conduction means are made of different materials, and a continuous circular gap is formed between said holding means and said heat conduction means.

44. A display device according to claim 43, wherein said heat conduction assist means is provided in a portion of said continuous circular gap to connect said holding means and said heat conduction means together.

45. A display device according to claim 44, wherein said heat conduction assist means is provided in at least one place in said gap that is formed in at least the portion in the direction at right angles with said light emitting means.

46. A display device according to claim 45, wherein said heat conduction assist means is provided in at least one place in said gap formed in the portion in the direction in parallel with said light emitting means, and the number of said heat conduction assist means is set to be smaller than the number of said heat conduction assist means that are provided in said gap formed in the portion in the direction at right angles with said light-emitting means.

47. A display device according to claim 45, wherein said heat conduction assist means is provided in at least one place in said gap formed in the portion in the direction in parallel with said light emitting means, and the width of said heat conduction assist means is set to be narrower than the width of said heat conduction assist means that are provided in said gap formed in the portion in the direction at right angles with said light-emitting means.

48. A display device according to claim 44, wherein said holding means and said heat conduction means are made of the same material, and a discrete gap is formed between said holding means and said heat conduction means via heat conduction assist means formed at predetermined portions.

49. A display device according to claim 48, wherein said heat conduction assist means is provided in at least one place in said gap formed in at least the portion in the direction at right angles with said light-emitting means.

50. A display device according to claim 49, wherein said heat conduction assist means is provided in at least one place in said gap formed in the portion in direction in parallel with said light-emitting means, and the number of said heat conduction assist means is smaller than the number of heat conduction assist means provided in the gap formed in the portion in the direction at right angles with the light-emitting means.

51. A display device according to claim 49, wherein said heat conduction assist means is provided in at least one place in said gap formed in the portion in direction in parallel with said light-emitting means, and the width of said heat conduction assist means is narrower than the width of the heat conduction assist means provided in the gap formed in the portion in the direction at right angles with the light-emitting means.

52. A display device according to claim 44 or 49, wherein said heat conduction assist means has resiliency and imparts a biasing force to said heat conduction means to urge it toward said light-guide means at all times.

* * * * *

UNITED STATES PATENT AND TRADEMARK OFFICE
CERTIFICATE OF CORRECTION

PATENT NO. : 5,742,366
DATED : Apr. 21, 1998
INVENTOR(S) : Imoto

It is certified that error appears in the above-identified patent and that said Letters Patent is hereby corrected as shown below:

The title page should be deleted to appear as per attached title page.

Please delete drawing sheets 1-4 and substitute drawing sheets 1-6 as per attached.

Col. 11, line 33, before "ligthguide" insert -- a --; and after "member" (second occurrence), insert -- , --.

Signed and Sealed this

Sixth Day of July, 1999

Attest:

Attesting Officer

Q. TODD DICKINSON

Acting Commissioner of Patents and Trademarks

United States Patent [19]

Imoto

[11] Patent Number: 5,742,366
[45] Date of Patent: Apr. 21, 1998

[54] LCD HAVING A HEAT CONDUCTION MEANS AND A HEAT ASSIST MEANS

[75] Inventor: Satoshi Imoto, Higashimurayama, Japan

[73] Assignee: Citizen Watch Co., Ltd., Tokyo, Japan

[21] Appl. No.: 808,176

[22] Filed: Feb. 28, 1997

Related U.S. Application Data

[63] Continuation of Ser. No. 171,455, Dec. 22, 1993, abandoned.

[30] Foreign Application Priority Data

Dec. 25, 1992 [JP] Japan ................................ 4-357790

[51] Int. Cl.$^6$ ........................ G02F 1/1333; G02F 1/1335
[52] U.S. Cl. ................................ 349/62; 349/58; 349/161
[58] Field of Search ........................ 359/49, 50, 83; 349/62, 70, 58, 161

[56] References Cited

U.S. PATENT DOCUMENTS

Re. 33,987  7/1992  Suzawa ................................ 359/49
4,748,546  5/1988  Ukrainsky ............................ 359/50
5,299,038  3/1994  Hamada et al. ..................... 359/49

OTHER PUBLICATIONS

Patent Abstracts of Japan, vol. 15, No. 477 (P-1283), Dec. 1991, Abstract of JP 3-204618, Sep. 1991.

*Primary Examiner*—William L. Sikes
*Assistant Examiner*—Toan Ton
*Attorney, Agent, or Firm*—Finnegan, Henderson, Farabow, Garrett & Dunner

[57]  ABSTRACT

A display device which suppresses the rise in temperature while making the distribution of temperature uniform, and features high display quality and reliability. The display device employs a light-guide plate provided with a heat conduction plate of a large heat conductivity on the back surface thereof. A gap is provided between the heat conduction plate and a holding member on the lower surface that holds the heat conduction plate, fluorescent tubes and the light-guide plate.

52 Claims, 6 Drawing Sheets